(12) United States Patent
Huang et al.

(10) Patent No.: US 11,157,487 B2
(45) Date of Patent: Oct. 26, 2021

(54) TRUSTED STORAGE METHOD AND SYSTEM BASED ON DIRECTED ACYCLIC GRAPH STRUCTURE

(71) Applicant: PEKING UNIVERSITY, Beijing (CN)

(72) Inventors: Gang Huang, Beijing (CN); Xuanzhe Liu, Beijing (CN); Ying Zhang, Beijing (CN); Yun Ma, Beijing (CN); Xiang Jing, Beijing (CN); Yi Wu, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 17/082,549

(22) Filed: Oct. 28, 2020

(65) Prior Publication Data

US 2021/0124734 A1    Apr. 29, 2021

(30) Foreign Application Priority Data

Oct. 28, 2019    (CN) .......................... 201911032676.8

(51) Int. Cl.
*G06F 16/23* (2019.01)
*G06F 16/901* (2019.01)
*G06F 21/64* (2013.01)
*G06Q 20/38* (2012.01)

(52) U.S. Cl.
CPC ...... *G06F 16/2379* (2019.01); *G06F 16/9024* (2019.01); *G06F 21/64* (2013.01); *G06Q 20/382* (2013.01); *H04L 2209/38* (2013.01)

(58) Field of Classification Search
CPC .. G06F 16/2379; G06F 16/9024; G06F 21/64; G06Q 20/382; H04L 2209/38
See application file for complete search history.

(56) References Cited

U.S. PATENT DOCUMENTS

| | | | |
|---|---|---|---|
| 2017/0344580 A1* | 11/2017 | King | G06F 16/137 |
| 2019/0324958 A1* | 10/2019 | Ow | H04L 9/0637 |
| 2019/0386817 A1* | 12/2019 | Carson | G06F 21/64 |
| 2020/0103930 A1* | 4/2020 | Suresh | G06F 1/06 |

* cited by examiner

*Primary Examiner* — Jay A Morrison
(74) *Attorney, Agent, or Firm* — Bayramoglu Law Offices LLC

(57) ABSTRACT

A trusted storage method and system based on a graph structure are provided. The method includes: in a process of initiating a transaction, randomly selecting, by each transaction initiating node, a plurality of witness nodes from a network for witnessing the transaction; packaging, by the witness nodes, transaction data generated by witnessing the transaction to generate blocks; randomly selecting, by the witness nodes, a plurality of storage nodes; sending, by the witness nodes, the blocks to the plurality of storage nodes; and storing, by the storage nodes, the blocks; wherein, for one transaction, all the blocks of all the witness nodes and all the storage nodes form a directed acyclic graph DAG structure. According to embodiments of the disclosure, the directed acyclic graph DAG structure is employed to be matched with an nRW consensus mechanism, so that a supervision problem in a large-scale sharing and exchanging process is solved.

3 Claims, 4 Drawing Sheets

Randomly select, by each transaction initiating node, multiple witness nodes from a network for witnessing a transaction in a process of initiating the transaction — S101

Package, by the witness node, transaction data generated by witnessing the transaction to generate a block — S102

Randomly select, by the witness node, multiple storage nodes — S103

Send, by the witness node, the block to the multiple storage nodes — S104

Store, by the storage node, the block; wherein, for one transaction, all the blocks of all the witness nodes and all the storage nodes constitute a directed acyclic graph DAG structure — S105

TRUSTED STORAGE METHOD AND SYSTEM BASED ON DIRECTED ACYCLIC GRAPH STRUCTURE

CROSS REFERENCE TO THE RELATED APPLICATIONS

This application is based upon and claims priority to Chinese Patent Application No. 201911032676.8, filed on Oct. 28, 2019, the entire contents of which are incorporated herein by reference.

TECHNICAL FIELD

The disclosure relates to the field of blockchain technologies, and more particularly, to a trusted storage method based on directed acyclic graph structure and a trusted storage system based on directed acyclic graph structure.

BACKGROUND

As a core force to drive the development of digital economy, and also a key factor to improve an intelligent level and operational efficiency of information society, data resources are regarded as strategic assets to determine future competitiveness. How to turn the huge data resources formed by the government, enterprises and institutions into assets and make the data resources become "new oil" to support the rise of the digital economy is a key challenge for the development of the digital economy.

To exert values of the data assets is a process of making data "move". Safe and trusted flow and processing integration of high-quality, high-availability and high-efficiency data assets is an important foundation to support big data analysis, circulation and application realization, thus promoting the development of the digital economy. Government, enterprises and other institutions have a large number of high-value core data. How to effectively guarantee safe and trusted sharing, flow and integration of the data assets, and prevent theft, abuse and misuse are the key issues in the process of trusted data circulation.

The value of the big data lies in that the data is used by people. However, due to the out-of-control problem of direct data transaction, it is difficult to share and exchange trusted data. Traditional trusted exchange infrastructures, such as Bitcoin, Ethereum and other blockchains, emphasize "currency transaction", and the whole platform is designed under the premise of "avoiding double spend attack". Therefore, strong consistency has become a major demand of these blockchain infrastructures. This requirement makes these traditional blockchain infrastructures unable to support "accounting" with large throughput. In the above scenario of data sharing and exchange, there is no "double spend attack" problem in data sharing and exchange, and what needs to be solved is the supervision problem in large-scale sharing and exchange process.

SUMMARY

The disclosure provides a trusted storage method based on a graph structure and a trusted storage system based on a graph structure to solve data security supervision problem in large-scale sharing and exchanging process.

In order to solve the foregoing problem, the disclosure discloses a trusted storage method based on directed acyclic graph structure, including:

in a process of initiating a transaction, randomly selecting, by each transaction initiating node, a plurality of witness nodes from a network for witnessing the transaction;

packaging, by the witness nodes, transaction data generated by witnessing the transaction to generate blocks;

randomly selecting, by the witness nodes, a plurality of storage nodes;

sending, by the witness nodes, the blocks to the plurality of storage nodes; and storing, by the storage nodes, the blocks;

wherein, for one transaction, all the blocks of all the witness nodes and all the storage nodes form a directed acyclic graph structure.

Preferably, a memory space of each of the blocks is 1024 bytes; and the step of packaging, by the witness nodes, the transaction data generated by witnessing the transaction to generate the blocks includes:

when a data volume of the transaction data generated by witnessing the transaction exceeds 1024 bytes, packaging, by the witness nodes, the transaction data to generate the blocks.

Preferably, in the DAG structure, each of the blocks has a plurality of preceding blocks and a plurality of subsequent blocks.

Preferably, the block includes a block header and a block body;

the block header includes IDs of the plurality of preceding blocks, a witness node signature, a timestamp, a unique identity Nonce, a data chain version, a number of blocks and a Merkle Tree root; and the block body includes the transaction data.

Preferably, when the witness nodes send the blocks to the plurality of storage nodes, the method includes:

broadcasting, by the witness nodes, the block headers of the blocks to other nodes in the network; and adding, by the nodes receiving the block headers, the block headers into a plurality of preceding blocks and a plurality of subsequent blocks corresponding to the blocks of the nodes receiving the block headers.

Preferably, for one transaction, a quantity of the witness nodes is three, and a quantity of storage nodes selected by each of the witness nodes is three.

In order to solve the foregoing problem, the disclosure further discloses a trusted storage system based on a graph structure, including:

a witness-node selecting module provided in a transaction initiating node and used to, in a process of initiating a transaction, randomly select a plurality of witness nodes from a network for witnessing the transaction;

a transaction-data packaging module provided in the witness nodes and used to package transaction data generated by witnessing the transaction to generate blocks;

a storage-node selecting module provided in the witness nodes and used to randomly select a plurality of storage nodes;

a block sending module provided in the witness nodes and used to send the blocks to the plurality of storage nodes; and a block storing module provided in the storage nodes and used to store the blocks;

wherein, for one transaction, all the blocks of all the witness nodes and all the storage nodes form a directed acyclic graph DAG structure.

Compared with the prior art, the disclosure has the following advantages:

in the embodiments of the disclosure, an nRW random witness mechanism is employed to prevent the transaction process from being tampered, each transaction initiating node that initiates the transaction randomly selects a plurality of witness nodes to witness the transaction, and each witness node packages the transaction to generate the block, and then selects multiple random storage nodes to back up and store the blocks; meanwhile, the directed acyclic graph DAG structure is employed, wherein the directed acyclic graph ledger structure is matched with an nRW consensus mechanism, so that the supervision problem in the large-scale sharing and exchanging process is solved, and a storage throughput of a distributed ledger according to the embodiments of the disclosure can be linearly expanded along with a number of nodes increasing.

DETAILED DESCRIPTION

Figure 1:
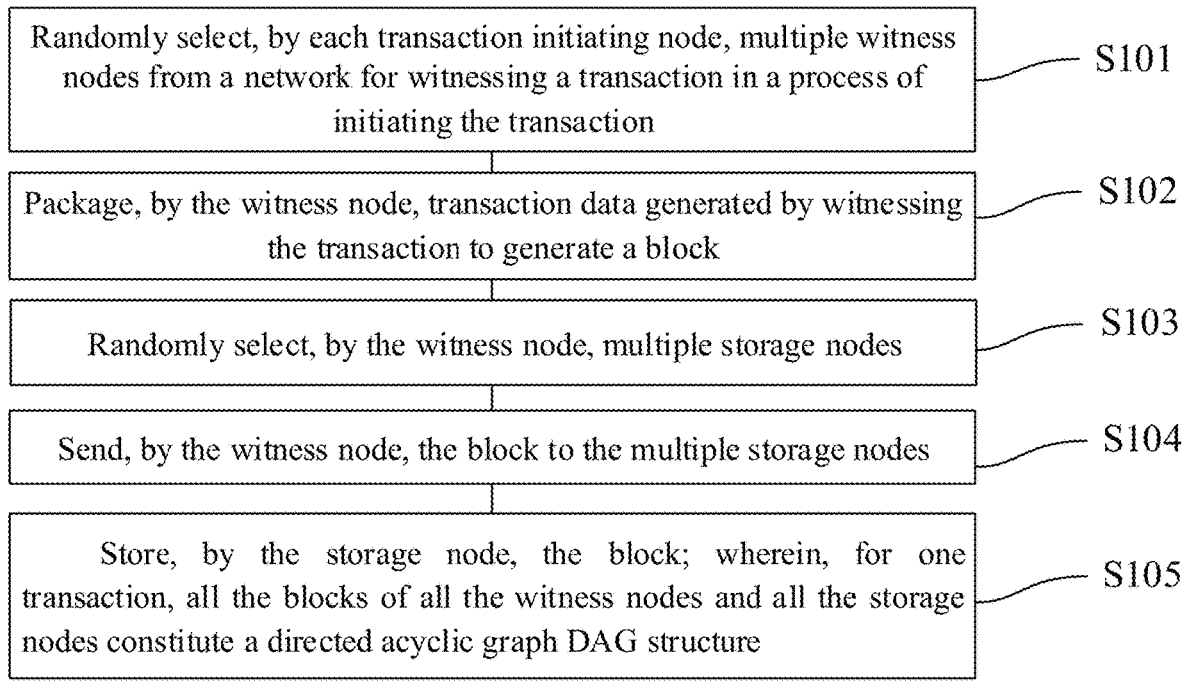
FIG. 1 is a flow chart of steps of a trusted storage method based on a graph structure according to an embodiment of the disclosure.

In order to make the above objects, features and advantages of the disclosure be more clearly understood, the disclosure will be described in further detail below with reference to the drawings and detailed description.

Trusted storage is often associated with a difficulty of tampering prevention. The traditional so-called tamper-proof blockchain is not guaranteed to be tamper-proof by 100%. For example, hackers stole about $50 million worth of Ether at that time (the Ether at this time was not the Ethereum at present) due to loopholes in smart contracts. At that time, Vitalik Buterin, the founder of Ethereum, adopted a strategy of hardfork to save losses of most people, and replaced the attacked chains with new long chains, so that those stole by the hackers were valueless. But at that time, some supporters of the community thought it was a decentralized community, the future of which could not be determined by one person. Therefore, these supporters were determined to resist the losses after being attacked by the hackers to ensure the decentralization of the community. Therefore, there was a contradiction in the community, and there were two chains after hardfork: Ethereum Classic (ETC) and Ethereum (ETH) today. Each chain has CPU power maintenance, so both chains are running well now. This event is actually the consensus result that Vitalik Buterin, the founder of Ethereum, modified (or can be said to have tampered with) nodes of the whole network through his own appeal, thus invalidating the hackers' attack behaviors that had already occurred. In addition, blockchains with POW consensus mechanism will have the problem of so-called 51% attack. In the white paper of Bitcoin, there is a description that is closest to the definition of 51% attack: "The system is secure as long as honest nodes collectively control more CPU power than any cooperating group of attacker nodes." In other words, the system is secure as long as honest computing nodes collectively control more CPU power than any attacker group. It can be inferred from this sentence that if someone wants to tamper with a transaction result of Bitcoin, one possible way is to control a large amount of CPU power (51%) in a Bitcoin network in a short time, and make the whole network accept this updated chain by generating more new blocks than an original number (from the block to be tampered to a case number of the current block).

Single-chain structures are mostly employed in traditional blockchains to ensure transaction legality and avoid double spend attack problem, and it is necessary to reach a consensus on a sequence between any two transactions, so the whole network nodes can only generate blocks one by one in sequence, and the speed is slow. Moreover, the whole network consensus mechanism of the traditional blockchains requires each participating node to store a full amount of data. However, the trusted storage realized by this whole network consensus mechanism will encounter obvious bottlenecks in throughput and storage overhead.

In view of the above problems, FIG. 1 illustrates a flow chart of steps of a trusted storage method based on a graph structure according to an embodiment of the disclosure, wherein the method may specifically include the following steps:

In step S101, each transaction initiating node randomly selects a plurality of witness nodes from a network for witnessing a transaction in a process of initiating the transaction;

in step S102, the witness node packages transaction data generated by witnessing the transaction to generate a block;

in step S103, the witness node randomly selects a plurality of storage nodes;

in step S104, the witness node sends the block to the plurality of storage nodes; and in step S105, the storage node stores the block;

wherein, for one transaction, all the blocks of all the witness nodes and all the storage nodes form a directed acyclic graph DAG structure.

Nodes refer to computers in a blockchain network (such as Peer-to-Peer P2P network system), including mobile phones, mining devices, servers, or the like. The transaction initiating node, the witness node and the storage node in the embodiment of the disclosure all refer to any of the above nodes.

The transaction initiating node may be a node that acquires initial data input or a node that transmits data (which may be a block) to neighbor nodes in the network. The transaction refers to a process of sending the data to a database or a target node, for example, the transaction initiating node acquires the data input of "Hello!", and then adds a target address to "Hello!", packages the data and sends the packaged data to a node corresponding to the target address, and this is a transaction process. In actual processing, the transaction may include multiple data storage, which may also be called multiple sub-transactions, for example, "I'm Davy", "nice to meet you", and the like, may be possibly included after inputting "Hello!". The "I'm Davy" and "nice to meet you" mentioned above are a sub-transaction respectively.

In an embodiment of the disclosure, the witness node may also be regarded as a consensus node, which is used to witness the above transaction, witness data, time, initiator, target person and the like of the transaction, and then package transaction data generated by witnessing the transaction to generate blocks. Based on the above description of the sub-transactions, the generated block may probably include multiple sub-transactions. Therefore, in a preferred embodiment of the disclosure, in order to facilitate data transmission, a storage capacity of the block is set to be 1024 bytes.

A concrete implementation method of the step S102 includes: when a data volume of the transaction data generated by witnessing the transaction exceeds 1024 bytes, packaging, by the witness nodes, the transaction data to generate the blocks.

Next, the witness node randomly selects a plurality of storage nodes and sends the block to the storage nodes for storage.

To facilitate understanding of the embodiment of the disclosure, further analysis is made as follows:

a first transaction initiating node is a node for acquiring user data input. The transaction initiating node initiates a transaction, randomly selects multiple first witness nodes to witness the process, and generates a first block, wherein the first block is randomly and dispersedly stored in multiple first storage nodes by the witness node.

In the above process, the first witness node may be regarded as a transaction in the process of generating the first block and sending the block to each first storage node. At this time, the first witness node may be regarded as a second transaction initiating node, which is equivalent to a node that initiated the transaction at the beginning (the node that acquires the user data input). Then, the first witness node will also randomly select multiple second witness nodes to witness the process of the transaction (generating the block and sending the block to each first storage node), and generate a second block, and the second witness node randomly selects multiple second storage nodes to store the second block.

The above-mentioned steps are cycled in sequence. Therefore, for one transaction, all the blocks of all the witness nodes and all the storage nodes form a directed acyclic graph DAG structure (DAG). "Directed" refers to having a direction, which should exactly refer to the same direction, and "acyclic" means non-circular). In the DAG structure according to the disclosure, each of the blocks has a plurality of preceding blocks and a plurality of subsequent blocks. For each node (such as the second witness node), the block of the previous transaction process (such as the first block) is a preceding block of the node, while the block generated by next transaction process is a successor block (such as the second block) of the node. Each node maintains the preceding blocks and subsequent blocks thereof, forming an infinitely extensible chain structure.

Figure 2:
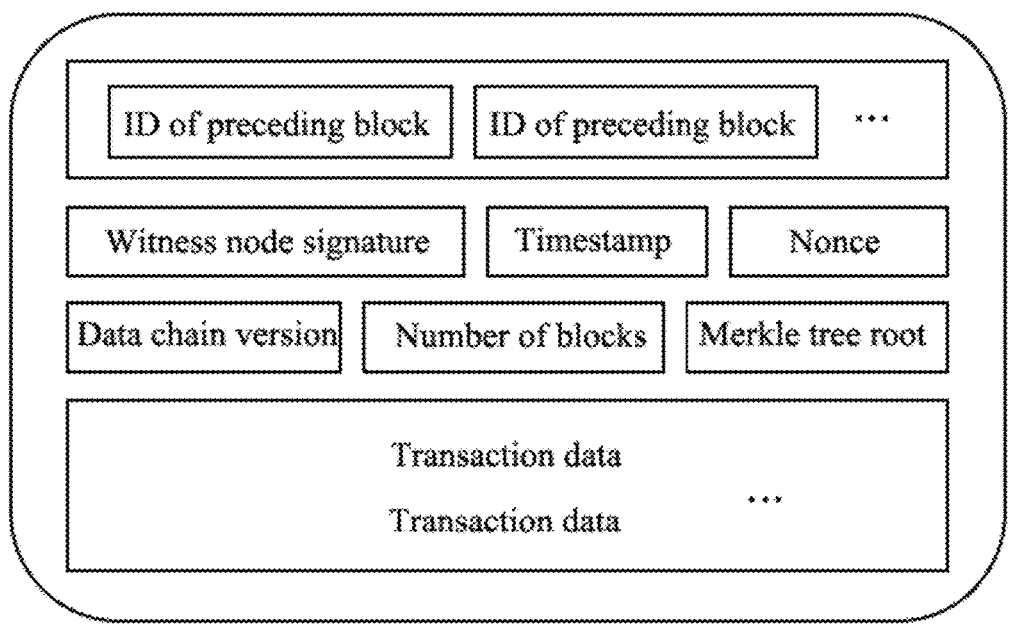
FIG. 2 is a structure diagram of data inside a block according to the embodiment of the disclosure.

On the basis of the above-mentioned contents, a structure diagram of data inside the block according to the embodiment of the disclosure is as shown in FIG. 2. The block includes a block header and a block body; wherein the block header includes IDs of the plurality of preceding blocks, a witness node signature, a timestamp, a unique identity Nonce, a data chain version, a number of blocks and a Merkle Tree root; wherein the block body includes the transaction data. Merkle Tree root stores meta-information of the transaction data, including generation time, Hash of actual data (i.e., block body), Hash value of previous block, and other information.

Figure 3:
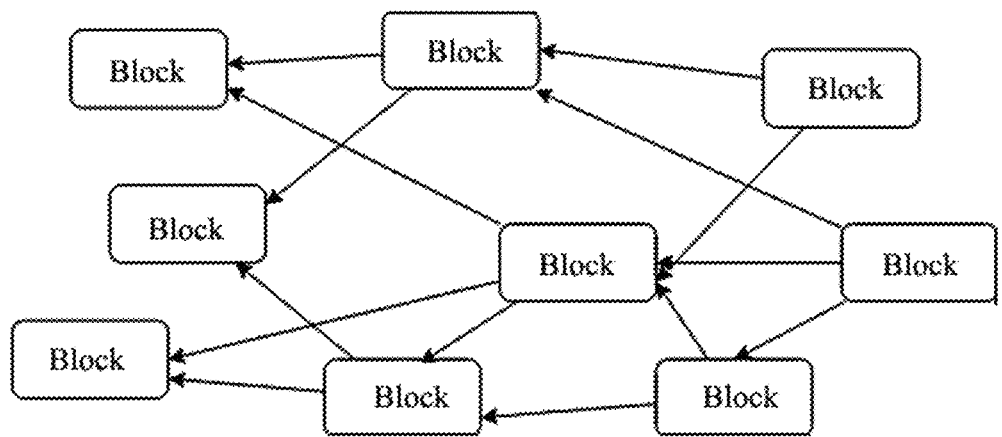
FIG. 3 is an organization structure diagram of the block according to the embodiment of the disclosure.

In this case, if a tamper wants to modify the transaction, the block for the transaction needs to be tampered. To tamper with each block, the preceding blocks of the block need to be obtained, and then a hash value of the previous block and actual data of the block thereof are used to calculate a hash value thereof, so that the block can be tampered. However, due to the exponential growth of the blocks involved in this transaction, the tamper has to find all the blocks generated for the transaction in the whole network (including the first block, the second block, a third block . . . ) and tamper with all the blocks. In terms of implementation, it is almost impossible to tamper with all the blocks, which increases the difficulty of tampering in the transaction process. FIG. 3 illustrates an organization structure diagram of the block according to the embodiment of the disclosure.

Single-chain structures are mostly employed in traditional blockchains to ensure transaction legality and avoid double spend attack problem, and it is necessary to reach a consensus on a sequence between any two transactions. Unlike Bitcoin, for the requirement of trusted storage in the embodiment of the disclosure, a plurality of witness nodes are selected, and the random storage process among each witness node is independent, so there is no need to reach a consensus on the strict sequence between transactions, and there is no need to synchronize the whole network, thus ensuring the trusted storage speed of transactions of the disclosure.

In a preferred embodiment of the disclosure, for one transaction, a quantity of the witness nodes is three, and a quantity of storage nodes selected by each of the witness nodes is three. For tampering with each block of each transaction, the tamper needs to find three witness nodes for each transaction in the full text, and then find three storage nodes randomly selected for each block. The setting mode of the "Three-Three Consensus" further increases the tampering difficulty of the tamper. In addition, it is not necessary to synchronize the DAG of the whole network since each node maintains the DAG thereof, thus avoiding the problem that the number of nodes called for the transaction is too large, which affects the trusted storage speed of the transaction.

In another preferred embodiment of the disclosure, when the witness nodes send the blocks to the plurality of storage nodes, the method further includes:

broadcasting, by the witness nodes, the block headers of the blocks to other nodes in the network; and adding, by the nodes receiving the block headers, the block headers into a plurality of preceding blocks and a plurality of subsequent blocks corresponding to the blocks of the nodes receiving the block headers. On the basis of the above-mentioned structure diagram of the data inside the block, the block header includes IDs of the plurality of preceding blocks, a witness node signature, a timestamp, a unique identity Nonce, a data chain version, a number of blocks and a Merkle Tree root. The witness node adopts the mode of broadcasting the block header of each block to other nodes, which further improves the difficulty of tampering, and the tamper has to destroy a block header record of the block recorded in other nodes while modifying the block, thus increasing the storage reliability of the disclosure on the transaction data.

In conclusion, the process of randomly selecting the witness nodes and randomly selecting the storage nodes in the embodiment of the disclosure is a random consensus process, and the nRW random witnesses (n-Random Witnesses) mechanism is adopted. And all the blocks of all the witness nodes and all the storage nodes form a directed acyclic graph DAG structure. Therefore, if a malicious tamper wants to tamper with this transaction, the witness nodes and the storage nodes stored randomly need to be found out first, and then all the blocks recorded with the transaction needs to be tampered. The directed acyclic graph ledger structure is matched with the nRW consensus mechanism, so that a supervision problem in a large-scale sharing and exchanging process is solved, and a storage throughput of a distributed ledger according to the embodiment of the disclosure can be linearly expanded along with a number of nodes increasing.

Figure 4:
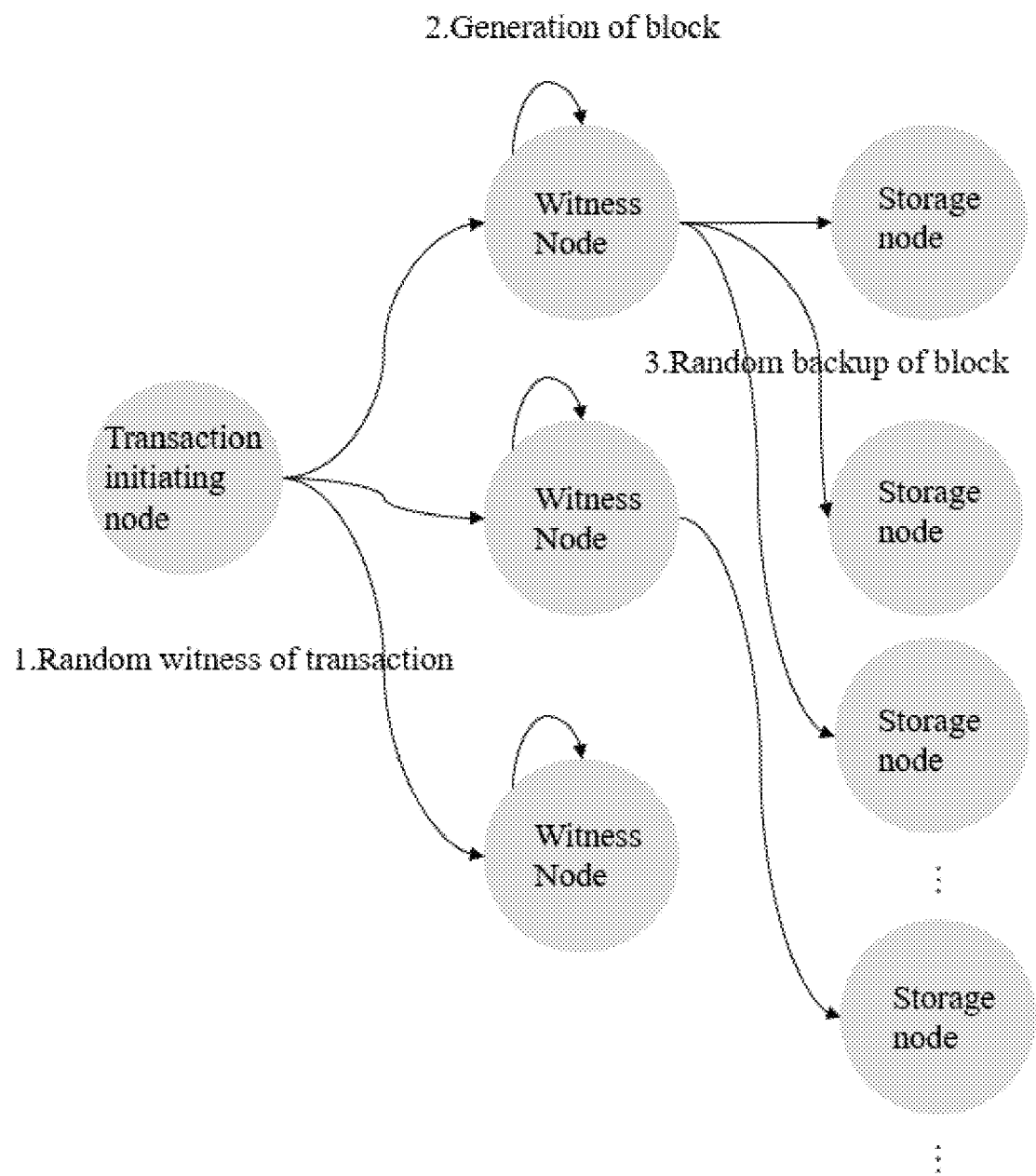
FIG. 4 is a schematic diagram of a witness-consensus process according to the embodiment of the disclosure.

FIG. 4 illustrates a schematic diagram of a witness-consensus process according to the embodiment of the disclosure. The solution of the embodiment of the disclosure is described in detail hereinafter.

Under the schematic structure of the embodiment of the disclosure, synchronization overhead between nodes increases linearly with the number of transactions increasing, which is irrelevant to the number of nodes. Network overhead of each transaction is n*m (n is the number of witness nodes selected for this transaction, and m is the number of storage nodes selected for this transaction). Storage overhead of each transaction is also n*m (n is the number of witness nodes selected for this transaction, and m is the number of storage nodes selected for this transaction). Therefore, with the number of nodes increasing, a storage capacity and a network bandwidth thereof increase, and the storage of the whole system can be expanded horizontally. However, for the traditional whole-network synchronized blockchain system with chain structure, storage overhead thereof depends on a number of nodes K. Therefore, with the number of nodes increasing, the storage overhead increases synchronously with the storage capacity increasing, which leads to the overall overhead increasing and the throughput decreasing with the number of nodes increasing.

Therefore, to modify certain transaction data (t), the following related nodes and blocks need to be modified:

1. A set of blocks where the transaction data locate: it is set that A={a|a is block, and a includes transaction t}, then card(A)=n.

2. A set of subsequent blocks of the block where the transaction data locate: for any block a1, a set of subsequent blocks thereof is B1={b|b is the subsequent block of a1}, then a set of all the subsequent blocks to be modified is UBi, wherein i=1, 2, . . . n.

The number of blocks is estimated hereinafter: for a certain block, with the increase of time, a number of subsequent blocks thereof also increase. In the traditional blockchain system with chain structure, for any transaction, a tampering cost required to modify the transaction is a number k of blocks and subsequent blocks of the transaction. In the graph structure blockchain of the embodiment of the disclosure, there is always time T for any given tampering cost k (indicating the number of blocks to be tampered with), so that card(A∪(UBi))>k. This shows that an anti-tampering ability of the graph structure blockchain proposed in the embodiment of the disclosure is equivalent to that of the chain structure, but the time spent is less, the speed is faster, and the throughput is larger.

Figure 5:
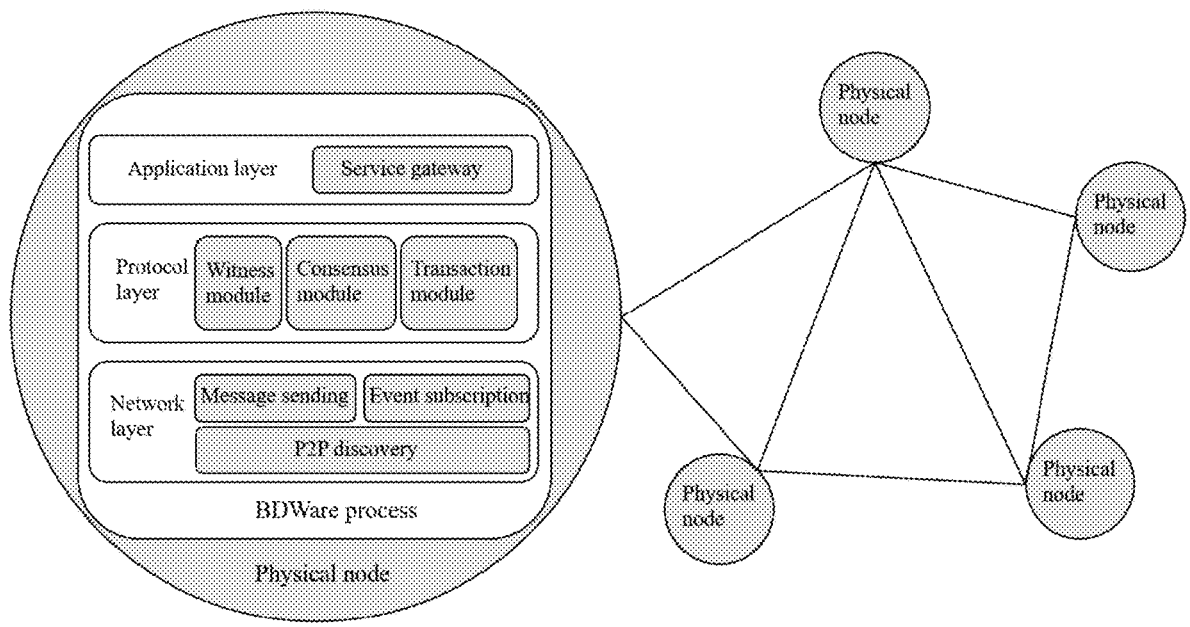
FIG. 5 is a topological structure diagram of a schematic distributed ledger system.

Libp2p is a modular network stack, which makes it easy for developers to build large and robust P2P networks by combining various transport and P2P protocols. Based on libP2P, the embodiment of the disclosure implements an example of a distributed schematic ledger. FIG. 5 illustrates a topological structure diagram of a schematic distributed ledger system, and a process according to an embodiment of the disclosure runs on each physical node, specifically including:

a network layer logic: provided with a p2p discovery module, which can discover other nodes joining the network;

a message sending module capable of implementing message communications between nodes;

an event subscription module capable of implementing event subscription between nodes;

a protocol layer: provided with a witness module and a consensus module implementing a witness process and a consensus process, and also provided with a transaction module providing support to an application layer; and an application layer: externally providing accounting (trusted storage) service in the form of service gateway.

An execution flow of the system is described hereinafter: a caller will initiate a trusted storage request through a GRPC (GRPC is an open-source high-performance, cross-language RPC framework of google) of the service gateway based on a HTTP2 protocol, protobuf 3.x and Netty4.x+. In fact, there is no big difference between GRPC and thrift, avro-rpc in general principle. In short, GRPC does not have many breakthrough innovations). An interface transmits contents needing trusted storage to a certain node. In the transaction module, relevant meta-information, such as initiator, receiver, sending time, verification code, etc., is packaged into a transaction record and handed over to the witness module for witness. The witness process is as described above, wherein a plurality of nodes are randomly selected to synchronize the transaction record. When the transactions are collected to a certain level (such as 1024 transactions), a consensus process of packaging to generate and distribute blocks will be carried out.

The witness process and the consensus process can be implemented by using both a message sending mechanism and an event subscription mechanism. Examples of these two implementations are respectively given below.

When being implemented by using the message sending mechanism, the process is simple. It is only necessary to find out all the nodes through p2p. A random algorithm is used for a certain witness or consensus process, and a plurality of nodes may be selected from all the nodes for witness or consensus.

When being implemented by using the event subscription mechanism, randomness of the witness process and the consensus process will be weakened. Before initiating a transaction, events may be subscribed with a regular policy, for example, the events are subscribed once every five minutes. Specifically, two events may be defined, including a consensus event and a witness event. Taking the witness event as an example, for any node A, the following process will be executed every five minutes: 1. randomly select a plurality of nodes and send a subscription request to these nodes; and 2. after receiving the subscription request, these nodes actively subscribe to the node A as the "witness event".

Whenever the witness process is triggered, the node issues the witness event (the event contains transaction contents), and the message (event) may be synchronized to these randomly selected nodes.

Another regular strategy based on the event subscription mechanism is that subscribers randomly generate a plurality of nodes and subscribe to witness events and consensus events of these nodes. In the subscription process, an average traffic of this method is 50% less than that of the first one. However, a number of event subscriptions for each node is a number of fixed nodes with a variance of 0. However, there is a certain variance in this method, and the variance depends on a random algorithm of the subscribed. In specific implementation, this strategy may be adopted to improve performances of the whole system if there is no need for anti-malicious nodes, but only anti-failure nodes.

It should be noted that, for the sake of simple description, the method embodiments are all expressed as a series of action combinations, but those skilled in the art should understand that the embodiments of the disclosure are not limited by the described action sequences, because certain steps may be performed in other sequences or concurrently according to the embodiments of the disclosure. Secondly, those skilled in the art should also understand that the embodiments described in the specification are all preferred embodiments, and the actions involved are not necessarily required by the embodiments of the disclosure.

Figure 6:
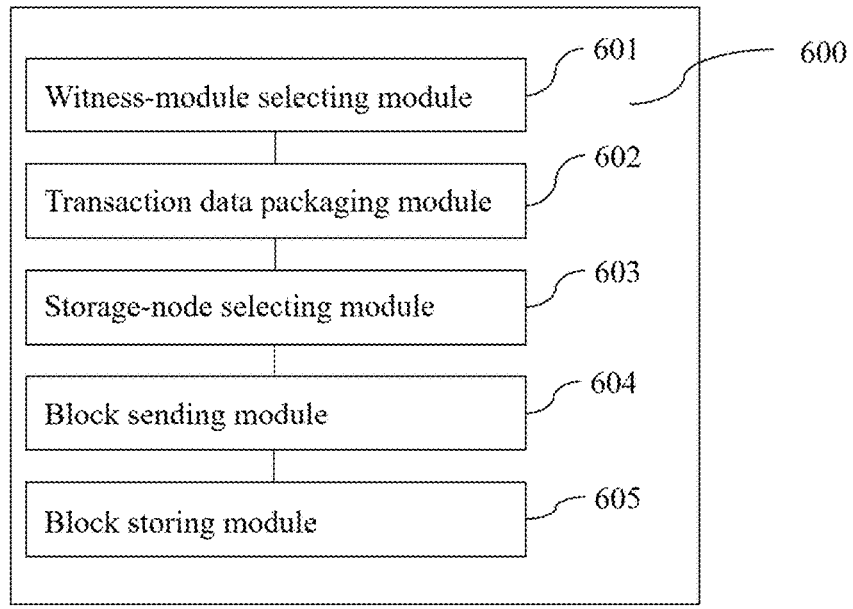
FIG. 6 is a structure diagram of a trusted storage system based on a graph structure according to an embodiment of the disclosure.

Corresponding to the method of FIG. 1, FIG. 6 illustrates a structure diagram of a trusted storage system based on a graph structure according to an embodiment of the disclosure, wherein the system 600 may include the following modules:

a witness-node selecting module 601 provided in a transaction initiating node and used to, in a process of initiating a transaction, randomly select a plurality of witness nodes from a network for witnessing the transaction;

a transaction-data packaging module 602 provided in the witness nodes and used to package transaction data generated by witnessing the transaction to generate blocks;

a storage-node selecting module 603 provided in the witness nodes and used to randomly select a plurality of storage nodes;

a block sending module 604 provided in the witness nodes and used to send the blocks to the plurality of storage nodes; and a block storing module 605 provided in the storage nodes and used to store the blocks;

wherein, for one transaction, all the blocks of all the witness nodes and all the storage nodes form a directed acyclic graph DAG structure.

Corresponding to the method of FIG. 1, in a preferred embodiment of the disclosure, a memory space of each of the blocks is 1024 bytes; and the transaction-data packaging module 602 includes the following submodule:

a block generation submodule provided in the witness nodes and used to, when a data volume of the transaction data generated by witnessing the transaction exceeds 1024 bytes, package the transaction data to generate the blocks.

Corresponding to the method of FIG. 1, in a preferred embodiment of the disclosure, in the DAG structure, each of the blocks has a plurality of preceding blocks and a plurality of subsequent blocks.

Corresponding to the method of FIG. 1, in a preferred embodiment of the disclosure, for one transaction, a quantity of the witness nodes is three, and a quantity of storage nodes selected by each of the witness nodes is three.

Corresponding to the method of FIG. 1, in a preferred embodiment of the disclosure, the block includes a block header and a block body;

the block header includes IDs of the plurality of preceding blocks, a witness node signature, a timestamp, a unique identity Nonce, a data chain version, a number of blocks and a Merkle Tree root; and the block body includes the transaction data.

Corresponding to the method of FIG. 1, in a preferred embodiment of the disclosure, when the witness nodes send the blocks to the plurality of storage nodes, the system further includes the following modules:

a block header broadcasting module provided in the witness nodes and used to broadcast the block header of the block to other nodes in the network; and a block header adding module configured in the node receiving the block header, and used to add the block header into a plurality of preceding blocks and a plurality of subsequent blocks corresponding to the block of the node receiving the block header.

As for the system embodiment, since it is basically similar to the method embodiment, the description of the device embodiment is relatively simple. For relevant points, please refer to the partial description of the method embodiment.

The embodiments in the disclosure are all described step by step, the important part of each embodiment mainly lies in the difference between other embodiments, and the same or similar part between each embodiment may be referred to each other.

The trusted storage method based on the graph structure and the trusted storage system based on the graph structure provided by the disclosure are described in detail above. Specific examples are applied to explain the principle and implementation of the disclosure herein. The above embodiments are only used to help understand the method of the disclosure and the core idea thereof. Meanwhile, for those of ordinary skills in the art, there will be changes in the specific implementation and application scope according to the idea of the disclosure. To sum up, the contents of this specification should not be construed as limiting the disclosure.

What is claimed is:

1. A trusted storage method based on a directed acyclic graph (DAG) structure, comprising:
    in a process of initiating a transaction, randomly selecting, by a transaction initiating node, a plurality of witness nodes from a network for witnessing the transaction;
    packaging, by the plurality of witness nodes, transaction data generated by witnessing the transaction to generate blocks;
    randomly selecting, by the plurality of witness nodes, a plurality of storage nodes;
    sending, by the plurality of witness nodes, the blocks to the plurality of storage nodes; and
    storing, by the plurality of storage nodes, the blocks;
    wherein, for the transaction, the blocks of the plurality of witness nodes and the plurality of storage nodes form the DAG structure;
    wherein in the DAG structure, each of the blocks has a plurality of preceding blocks and a plurality of subsequent blocks;
    wherein each of the blocks comprises a block header and a block body;
    the block header comprises IDs of the plurality of preceding blocks, a witness node signature, a timestamp, a unique identity Nonce, a data chain version, a number of the blocks and a Merkle Tree root; and
    the block body comprises the transaction data;
    wherein when the plurality of witness nodes send the blocks to the plurality of storage nodes, the trusted storage method comprises:
    broadcasting, by the plurality of witness nodes, the block headers of the blocks to nodes excluding the plurality of witness nodes in the network; and
    adding, by the nodes receiving the block headers, the block headers into the plurality of preceding blocks and the plurality of subsequent blocks corresponding to the blocks of the nodes receiving the block headers.

2. The trusted storage method according to claim 1, wherein a memory space of each of the blocks is 1024 bytes; and
    the step of packaging, by the plurality of witness nodes, the transaction data generated by witnessing the transaction to generate the blocks comprises:
    when a data volume of the transaction data generated by witnessing the transaction exceeds 1024 bytes, packaging, by the plurality of witness nodes, the transaction data to generate the blocks.

3. The trusted storage method according to claim 1, wherein for the transaction, a quantity of the plurality of witness nodes is three, and a quantity of the plurality of storage nodes selected by each of the plurality of witness nodes is three.

\* \* \* \* \*